(12) United States Patent
Zhang et al.

(10) Patent No.: US 10,662,927 B2
(45) Date of Patent: May 26, 2020

(54) DEVICE AND METHOD FOR ROTATING ROTOR OF WIND POWER GENERATOR AND WIND POWER GENERATOR

(71) Applicant: JIANGSU GOLDWIND SCIENCE & TECHNOLOGY CO., LTD., Yancheng (CN)

(72) Inventors: Zhu Zhang, Yancheng (CN); Huixun Li, Beijing (CN); Yanhui Li, Beijing (CN); Xingang Zhang, Yancheng (CN); Xiang Zhao, Beijing (CN); Ye Li, Yancheng (CN)

(73) Assignee: JIANGSU GOLDWIND SCIENCE & TECHNOLOGY CO., LTD., Yancheng, Jiangsu (CN)

( * ) Notice: Subject to any disclaimer, the term of this patent is extended or adjusted under 35 U.S.C. 154(b) by 162 days.

(21) Appl. No.: 15/757,332

(22) PCT Filed: Jun. 30, 2017

(86) PCT No.: PCT/CN2017/091033
§ 371 (c)(1),
(2) Date: Mar. 2, 2018

(87) PCT Pub. No.: WO2018/040715
PCT Pub. Date: Mar. 8, 2018

(65) Prior Publication Data
US 2019/0072077 A1 Mar. 7, 2019

(30) Foreign Application Priority Data
Aug. 29, 2016 (CN) .......................... 2016 1 0765934

(51) Int. Cl.
F03D 13/10 (2016.01)
F03D 1/06 (2006.01)
(Continued)

(52) U.S. Cl.
CPC ........... F03D 13/10 (2016.05); F03D 1/0608 (2013.01); F03D 80/50 (2016.05); F03D 1/0658 (2013.01);
(Continued)

(58) Field of Classification Search
CPC ........ F03D 1/0608; F03D 1/0658; F03D 9/25; F03D 13/10; F03D 80/50; F05B 2260/507;
(Continued)

(56) References Cited

U.S. PATENT DOCUMENTS 7,958,797 B2 6/2011 Aust et al.
8,210,810 B2 * 7/2012 Egoshi ..................... F03D 1/06
416/1

(Continued)

FOREIGN PATENT DOCUMENTS

CN 102695875 A 9/2012
CN 103502635 A 1/2014
(Continued)

OTHER PUBLICATIONS

Office Action issued in Chinese Patent Application No. 201610765934.3, dated Nov. 27, 2018.
(Continued)

Primary Examiner — Igor Kershteyn
(74) Attorney, Agent, or Firm — Finnegan, Henderson, Farabow, Garrett & Dunner LLP

(57) ABSTRACT

A device and method for rotating a rotor of a wind power generator and a wind power generator are provided. The device includes at least two rotating units, and each of the rotating units includes a telescopic cylinder, a mounting base configured to connect a fixed end of the telescopic cylinder to a stand of the wind power generator, and detachably connected to the stand; and a pin arranged at a movable end
(Continued)

of the telescopic cylinder, configured to be releasably fixed to the rotor, and configured to drive the rotor to rotate relative to the stand by a stroke movement of the telescopic cylinder.

14 Claims, 7 Drawing Sheets

(51) Int. Cl.
 *F03D 80/50* (2016.01)
 *F03D 9/25* (2016.01)
(52) U.S. Cl.
 CPC .......... *F03D 9/25* (2016.05); *F05B 2260/507* (2013.01); *F05B 2270/326* (2013.01); *Y02E 10/721* (2013.01); *Y02E 10/722* (2013.01)
(58) Field of Classification Search
 CPC . F05B 2270/326; Y02E 10/721; Y02E 10/722
 See application file for complete search history.

(56) References Cited

U.S. PATENT DOCUMENTS

| | | | |
|---|---|---|---|
| 9,464,625 | B2 | 10/2016 | Brenner et al. |
| 2006/0196288 | A1 | 9/2006 | Aust et al. |
| 2012/0137481 | A1* | 6/2012 | Lindberg ............... F03D 1/0658 29/23.51 |
| 2012/0181792 | A1 | 7/2012 | Pettersen et al. |
| 2013/0076042 | A1* | 3/2013 | Amano ................... F03D 80/88 290/55 |
| 2014/0110949 | A1 | 4/2014 | Brenner et al. |
| 2014/0224048 | A1 | 8/2014 | Munk-Hansen |
| 2017/0051722 | A1* | 2/2017 | Knoop ................. F03D 7/0204 |

FOREIGN PATENT DOCUMENTS

| | | |
|---|---|---|
| CN | 103742372 A | 4/2014 |
| CN | 203627104 U | 6/2014 |
| CN | 103982377 A | 8/2014 |
| CN | 106438197 A | 2/2017 |
| CN | 106677993 A | 5/2017 |
| CN | 106762438 A | 5/2017 |
| DE | 102010020355 A1 | 11/2011 |
| EP | 1659286 A1 | 5/2006 |
| EP | 2458209 A2 | 5/2012 |
| JP | 2011-163324 A | 8/2011 |
| WO | WO 2015/169605 A1 | 11/2015 |

OTHER PUBLICATIONS

Extended European Search Report dated Mar. 14, 2019, issued in European Application No. EP 17842352.1.
International Search Report issued in International Application No. PCT/2017/091033, from the State Intellectual Property Office of China dated Sep. 27, 2017.

* cited by examiner

DEVICE AND METHOD FOR ROTATING ROTOR OF WIND POWER GENERATOR AND WIND POWER GENERATOR

This application is the national phase of International Application No. PCT/CN2017/091033, titled "DEVICE AND METHOD FOR ROTATING ROTOR OF WIND POWER GENERATOR AND WIND POWER GENERATOR", filed on Jun. 30, 2017, which claims the benefit of priority to Chinese Patent Application No. 201610765934.3 titled "DEVICE AND METHOD FOR ROTATING ROTOR OF WIND POWER GENERATOR AND WIND POWER GENERATOR", filed with the Chinese State Intellectual Property Office on Aug. 29, 2016, the entire disclosures of which are incorporated herein by reference.

FIELD

The present application relates to the technical field of wind power generation, and particularly to a device and method for rotating a rotor of a wind power generator and a wind power generator.

BACKGROUND

A wind power generator is a kind of electric equipment which converts wind energy into mechanical energy and converts mechanical energy into electric energy. The principle of wind power generation is to drive vanes of a wind turbine to rotate by wind force, to drive the generator to generate power.

Major components of the wind power generator include a nacelle, a generator and vanes. The generator includes a rotor and a stator, a main shaft of the rotor is provided with a huh, the vane is mounted on the hub of the rotor and are used to receive a wind force to drive the rotor to rotate, to further drive the rotor of the generator to rotate, and a winding of the stator of the generator cuts magnetic lines of force to generate electric energy.

The number of the vane is at least one, and is preferably three in general. In a case that the number of the vanes is greater than one, the position of the hub is required to be changed to meet the demand for assembling different vanes. That is, after one vane is assembled, the hub needs to be rotated by a certain angle from this position to another position, and then another vane is assembled. Also, when the vane is to be repaired or maintained, it also needs to adjust the vane to be at an appropriate angle.

At present, the position adjustment of the vane is mainly realized by using a rotating device provided in the wind power generator to drive the vane. The rotating device is arranged inside the nacelle or partially outside the nacelle. The rotating device can drive the rotor to rotate relative to the stator, to further drive the hub connected to a rotor shaft to rotate, so as to achieve the position adjustment of the vane.

The rotating device in the conventional technology is integrally formed with the nacelle of the wind power generator, which increases the weight of the nacelle and is adverse to the overall layout of the wind power generator.

Therefore, a technical issue to be urgently addressed by the person skilled in the art is to improve the rotating device in the conventional technology, to reduce the weight of the nacelle and facilitate mounting the rotating device on the premise of achieving a position change of the vane reliably.

SUMMARY

In order to address the above technical issue, the following technical solutions are provided according to the present application. A device for rotating a rotor of a wind power generator includes at least two rotating units, and each of the rotating units includes:

a telescopic cylinder a mounting base configured to connect a fixed end of the telescopic cylinder to a stand of the wind power generator, and detachably connected to the stand; and a pin arranged at a movable end of the telescopic cylinder, configured to be releasably fixed to the rotor, and configured to drive the rotor to rotate relative to the stand by a stroke movement of the telescopic cylinder.

A method for driving a rotor to rotate includes:

connecting a fixed end of each of telescopic cylinders to a stand by a respective mounting base;

fixing a movable end of each of the telescopic cylinders to the rotor by a respective pin; and controlling the telescopic cylinders to perform stroke movements, to drive the rotor to rotate relative to the stand.

A device for rotating a rotor of a wind power generator includes at least two rotating units, and each of the rotating units includes a telescopic cylinder and a pin, and a fixed end of the telescopic cylinder is detachably connected to the stand; and the pin is arranged at a movable end of the telescopic cylinder, is configured to be releasably fixed to the rotor, and is configured to drive the rotor to rotate relative to the stand by a stroke movement of the telescopic cylinder.

A method for driving a rotor to rotate includes:

connecting a fixed end of each of telescopic cylinders to a stand;

fixing a movable end of each of the telescopic cylinders to the rotor by a respective pin; and controlling the telescopic cylinders to perform stroke movements, to drive the rotor to rotate relative to the stand.

A wind power generator includes a nacelle, a rotor and a stator. A side wall of the rotor is provided with multiple pin holes arranged in a circumferential direction of the rotor, the pin holes are cooperatively connected to pins of a device for rotating the rotor of the wind power generator. Or, the rotor is provided with an additional frame, and the additional frame is provided with multiple pin holes arranged in a circumferential direction of the additional frame, and the pin holes are cooperatively connected to pins of a device for rotating the rotor of the wind power generator.

In a case that the device according to the present application is applied to vane installation or vane maintenance, first, the fixed portions of the telescopic cylinders are fixedly connected to the stand of the wind power generator by the mounting bases, and the pins at the movable portions of the telescopic cylinders are arranged inside respective pin holes of the side wall of the rotor; and then the movable ends of the telescopic cylinders are driven to extend or retract, and the movable ends of the telescopic cylinders will drive the rotor to rotate circumferentially by the pins, and the rotor rotates to drive the hub fixed to a rotor shaft to rotate, so as to eventually rotate to a position suitable for vane installation or vane maintenance.

In addition, the telescopic cylinders can be locked in a certain operation state by controlling a drive source of the telescopic cylinder, and thus, the relative position between the rotor and the pins can be locked, and the locking of position of the rotor can be achieved without providing an additional locking means, thus improving the safety of vane installation and vane maintenance, and facilitating simplifying the mechanism.

After the vane installation or vane maintenance is finished, since the fixed end of the telescopic cylinders are detachably connected to the stand by the mounting bases, the telescopic cylinders can be detached from the stand, and after the pins are disengaged from the pin holes of the rotor, the telescopic cylinders may just be separated from the rotor, to finally achieve the separation of the device for rotating the rotor of the wind power generator according to the present application from the wind power generator. That is, the device for rotating the rotor of the wind power generator herein is independent of the wind power generator, and thus the overall weight of the wind power generator can be reduced.

The wind power generator has the device for rotating the rotor of the wind power generator, and therefore having the above-described technical effects of the device.

Similarly, the above methods are carried out by means of the device for rotating the rotor of the wind power generator, and therefore having the above-described technical effects of the device.

REFERENCE NUMERALS IN FIGS. 1 TO 8

1 annular base,
27 stand,
28 rotor,
28a pin hole,
29 pin shaft,
31 vane,
32 hub,
50, 50a, 50b, 50c, 50d, 50e rotating unit,
51, 51a, 51b, 51c, 51d, 51e telescopic cylinder,
522 body,
521, 521a, 521b, 521c, 521d, 521e hinge base,
52 mounting base,
53, 53a, 53b, 53c, 53d, 530 pin,
54, 54a, 54b, 54c, 54d, 54e hinge shaft,
55, 55a, 55b, 55c, 55d, 55e support plate;
60, 60a, 60b, 60c, 60d, 60e rotating unit,
61, 61a, 61b, 61c, 61d, 61e telescopic cylinder,
62, 62a, 62b, 62c, 62d, 62e pin,
63 hinge shaft,
30 U-shaped plate,
301 first side wall,
301a through hole,
302 second side wall,
302a through hole,
303 transverse wall,
281 additional frame,
281a pin hole.

DETAILED DESCRIPTION

The present application is described in further detail with reference to the drawings and embodiments in order to enable the person skilled in the art to have a better understanding of the technical solutions of the present application.

As described in the background, a wind power generator includes a nacelle, a rotor and a stator. A hub is connected to a rotating shaft of the rotor, and a vane is mounted on the hub. The number of the vane is at least one, and preferably is three in general. There are mainly two types of arrangements for arranging the rotor and stator in a wind power generator, including a first arrangement with an inner rotor and an outer stator and a second arrangement with an outer rotor and an inner stator. Herein, a generator having the outer rotor and the inner stator is taken as an example to introduce the technical solution, and of course, the application of the technical solution herein to a generator having the inner rotor and the outer stator is not excluded.

Permanent magnetic steels are distributed on an inner wall of the rotor circumferentially, and a winding is provided on an outer peripheral wall of the stator, and the stator is mounted inside the rotor. The stator is fixedly mounted on a stator support, and the stator support is fixedly connected to an upper end of a tower.

Specifically, the nacelle is mounted at an upper end portion of the tower and the nacelle is circumferentially rotatably connected to the tower, and the nacelle and the tower can be rotatably connected by a bearing. The upper end portion of the tower partially extends into the interior of the nacelle.

Figure 5:
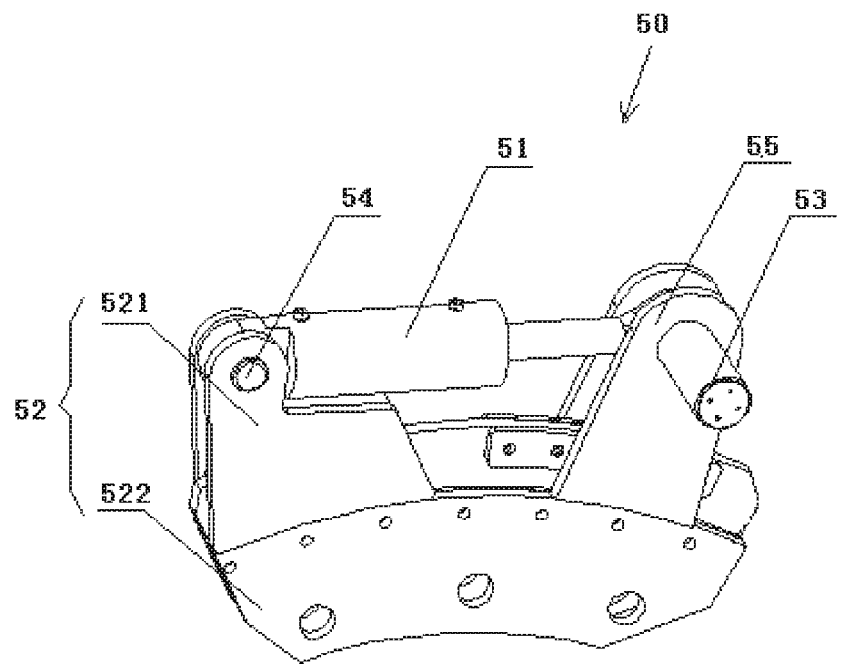
FIG. 5 is a schematic view showing the structure of a rotating unit according to a fourth embodiment of the present application.

A device for rotating a rotor of a wind power generator is provided according to the present application. The device includes at least two rotating units 50 as shown in FIG. 5, and each of the rotating units 50 includes a telescopic cylinder 51 and a mounting base 52. The telescopic cylinder 51 may be a hydraulic cylinder or an air cylinder. The telescopic cylinder herein is preferably embodied as a hydraulic cylinder. The rotating unit further includes a pin 53.

The mounting base 52 mainly functions to connect a fixed end of the telescopic cylinder 51 to a stand 27 of the wind power generator. The stand 27 is located at the upper end of the tower and provides a support platform for mounting other components in the nacelle. Generally, the fixed end of the telescopic cylinder 51 is fixedly connected to the mounting base 52, that is, the mounting base 52 can be appropriately arranged according to the connection structure of the fixed end of the telescopic cylinder 51. The telescopic cylinder 51 may also be connected to the mounting base by a hinge shaft 54, that is, the mounting base is provided with a hinge base 521 and the fixed end of the telescopic cylinder 51 is hinged to the hinge base 521.

Also, in the example of FIG. 5, the mounting base 52 is detachably connected to the stand 27, that is, the telescopic cylinder 51 and the stand 27 are detachably connected by the mounting base 52.

Figure 2:
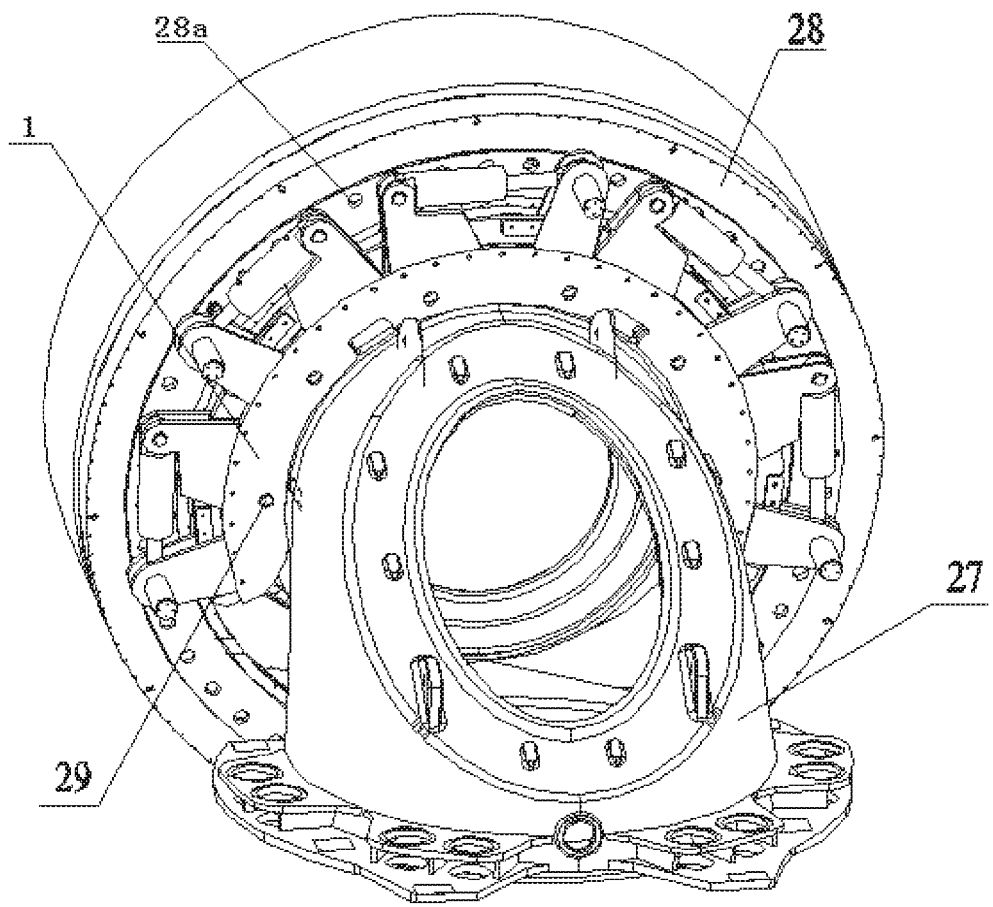
FIG. 2 is a schematic view showing a local structure of the device in FIG. 1 mounted on the wind power generator.

The pin 53 is arranged at a movable end of the telescopic cylinder, and cooperates with a pin hole in a side wall of a rotor 28, to realize locking or unlocking. Specifically, as shown in FIG. 2, a side wall, towards the stand 27, of the rotor 28 is provided with pin holes 28a, and a spacing between two adjacent pin holes can be selected appropriately according to the practical application environment.

In a case that the device according to the present application is applied to vane installation or vane maintenance, firstly, at least two rotating units 50 are lifted into the interior of the nacelle. Then, the fixed ends of the telescopic cylinders 51 are fixedly connected to the stand 27 of the wind power generator by the respective mounting bases 52, and the movable ends of the telescopic cylinders are fixed to the rotor 28 by the respective pins 53, that is, the pins 53 at the movable ends of the telescopic cylinders are arranged inside the respective pin holes 28a of the side wall of the rotor 28. Next, a stroke movement of each of the telescopic cylinders 51 is controlled to drive the movable portion of the telescopic cylinder to extend or retract, and the movable portion of each of the telescopic cylinders will drive the rotor 28 to rotate circumferentially by the pin 53, to drive the rotor 28 to rotate relative to the stand 27. The rotor 28 is rotated to drive the hub fixed to a rotor shaft to rotate, to eventually rotate to a position suitable for vane installation or vane maintenance.

The telescopic cylinders 51 can be locked in a certain operation state by controlling drive sources of the telescopic cylinders, and thus, the relative positions between the rotor 28 and the pins 53 can be locked, and the locking of position of the rotor 28 can be achieved without providing an additional locking means, which improves the safety in vane installation and vane maintenance, and facilitates simplifying the mechanism.

After the vane installation or vane maintenance finishes, since the fixed ends of the telescopic cylinders are detachably connected to the stand 27 by the mounting bases 52, the mounting bases can be detached from the stand 27, and the pins 53 can be disengaged from the pin holes 28a of the rotor 28, to separate the pins 53 and the movable ends of the telescopic cylinders 51 from the rotor 28, and finally achieve the separation of the rotating units 50 from the wind power generator, and the rotating units can be moved out of the nacelle. That is, the device for rotating the rotor of the wind power generator herein is independent of the wind power generator, and thus the overall weight of the wind power generator can be reduced.

In a case that the rotational angle of the rotor is relatively large, and the desired rotational angle of the rotor 28 cannot be reached yet even when the telescopic cylinders extend to the maximum length, the rotor 28 can be rotated by the desired angle by driving the telescopic cylinders to extend or retract for multiple times. Herein, one extending process or one retracting process performed by the telescopic cylinder is referred to as one stroke. That is, the telescopic cylinders perform multiple stroke movements to drive the rotor 28 to rotate by the desired angle.

The telescopic cylinder extending to push the rotor 28 to rotate is taken as an example, after the telescopic cylinder extends (a first stroke), the pin 53 is required to be disengaged from the rotor pin hole 28a, and then the telescopic cylinder is retracted to restore to an initial length (a second stroke), then the pin 53 is again inserted into a corresponding pin hole 28a of the rotor 28, and then the telescopic cylinder is driven to extend (a third stroke), to continue to push the rotor 28 to rotate. In order to avoid the reverse rotation of the huh in the process when the pin is changed from the unlocked state to the locked state, the following configurations are made herein.

The device according to the present application includes at least two rotating units 50, and the rotating units are arranged in a circumferential direction of the rotor 28. All the rotating units are divided into two groups according to different movement states of the rotating units in an unlocking process. A first group is defined as an unlocking unit group, and a second group is defined as a locking unit group. In the process that the pins 53 of the first group of rotating units are detached from the rotor 28 and are fixed to the rotor 28 again, the pins 53 of the second group of rotating units are fixedly connected to the rotor 28. After the pins of all of the rotating units are relocked, the telescopic cylinders 51 in all of the rotating units are controlled to change states to rotate the rotor 28.

That is, not all the pins of the rotating units are separated from the rotor 28 at the same time, instead, while a part of the pins are separated from the rotor 28, the other part of the pins are locked with respect to the rotor 28, thus in the rotating device, the rotating units are unlocked, moved and relocked to the rotor 28 sequentially. There are always a part of the pins being locked with respect to the rotor 28 throughout the whole process, to avoid uncontrolled rotation of the rotor 28.

Specifically, one rotating unit may constitute one group, and two or more rotating units may also constitute one group, as long as the rotor 28 can be reliably locked in the process that a part of the rotating units are restored to the initial states. The detailed control strategy of the five rotating units is described in detail hereinafter.

Referring to FIG. 5, the mounting base 52 is detachably connected to the stand 27, and the mounting base 52 specifically includes a hinge base 521 and a body 522. The hinge base 521 is arranged on the body 522, and the fixed end of the telescopic cylinder is hinged to the hinge base 521. The mounting base 52 is further provided with a support plate 55, the movable end of the telescopic cylinder is detachably connected to the support plate 55, and the support plate 55 is slidable back and forth relative to the body 522. The pin 53 is arranged at one end, away from the body 522, of the support plate 55.

Accordingly, when the rotating unit 50 is in operation, the mounting base 52 is fixed to the stand 27, the pin 53 passes through the support plate 55 and the movable end of the telescopic cylinder 51 and extends into the pin hole of the rotor 28, thereby fixedly connecting the movable end of the telescopic cylinder 51 to the rotor 28. When the telescopic cylinder 51 drives the support plate 55 to slide relative to the mounting base body 522 in the circumferential direction, the pin 53 is moved synchronously with the support plate, thus further driving the rotor 28 to rotate.

It is to be noted that a radius of the circumferential motion track of each of the support plate 55 and the mounting base body 522 can be appropriately selected according to a diameter of the rotor 28, as long as the extending and retracting of the telescopic cylinder can drive the rotor 28 to move reliably.

The specific structure of the mounting base in the rotating unit may be in various forms, and two embodiments are described herein.

Referring further to FIG. 5, in a first embodiment, the device for rotating the rotor of the wind power generator may include multiple rotating units 50. For each rotating unit 50, the mounting base body 522 may be further provided with a guide portion, and the support plate 55 is slidably connected to the guide portion. The body 522 is provided with a connection structure detachably connected to the stand 27. Preferably, the body 522 and the stand 27 may be fixedly connected by a bolt or a pin shaft, and the connection structure on the body may be a bolt hole or a pin shaft hole. Thus, the mounting base 52 can be detachably connected to the stand 27.

Multiple rotating units 50 are combined to form an annular structure, and the annular structure has a radian preferably in the range of 170 degrees to 220 degrees. The radian of the annular structure is not limited to this, and may also be in the range of 90 degrees to 360 degrees, as long as the hydraulic cylinder can provide a sufficient driving force to drive the rotor to rotate.

In this embodiment, the rotating units are independent of each other, and can be separately lifted and sequentially mounted, and there is a low requirement on a sling and a hoisting device used for lifting the rotating units.

Figure 3:
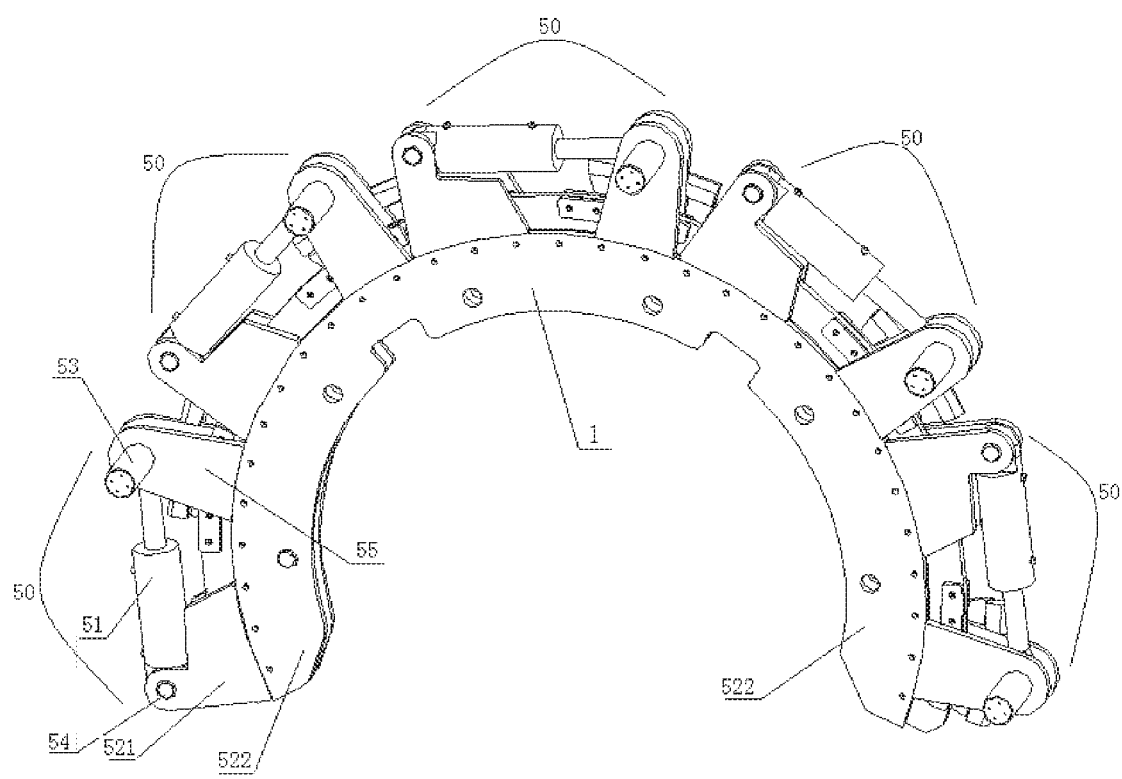
FIG. 3 is a schematic view showing the structure of a device for rotating the rotor of the wind power generator according to a second embodiment of the present application.

In another embodiment, the rotating units may be integrated as an integral structure. As shown in FIG. 3, the bodies 522 of the mounting bases of at least two rotating units are connected to form an annular base 1, and the annular base 1 has an opening facing the stand 27. The hinge bases 521 of the mounting bases of the rotating units are fixedly connected to the annular base 1. The annular base 1 is provided with a guide portion, and the support plates 55 of the rotating units are slidably connected to the guide portion. Preferably, the annular base 1 is provided with an annular groove, and the bodies of the mounting bases of the rotating units are fixedly connected to side walls of the annular groove, and the support plates of the rotating units are slidable along the annular groove.

The annular base 1 is provided with a connection structure configured to detachably connect the annular base 1 to the stand 27, and the annular base 1 may be fixed to the stand 27 by a bolt or a pin shaft, and the connection structure is a bolt hole or a pin shaft hole formed in the annular base 1. FIG. 2 shows an embodiment in which the annular base 1 is fixed to the stand 27 by a pin shaft 29.

It is to be noted that the annular base 1 has an opening facing the stand 27, to cooperate with a support shaft of the stand 27, which facilitates mounting the annular base 1 on the stand 27. Preferably, the radian of the annular base 1 is in the range of 170 degrees to 220 degrees. The radian of the annular base 1 is not limited to this, and may be in the range of 90 degrees to 360 degrees, as long as the telescopic cylinder can provide a sufficient driving force to drive the rotor to rotate.

The device for rotating the rotor of the wind power generator according to the above embodiments has an integral structure, which facilitates transport and hoisting.

Of course, in the above two embodiments, the connection between the annular base 1 and the stand 27 and the connection between the body and the stand 27 are not limited to the bolt and pin shaft connection, and may be implemented in other connection manners, for example, fixing with a fixture.

As shown in FIG. 2, in this embodiment, the annular base 1 is fixed onto the stand 27, and the stand 27 provides a supporting force for the rotating device, thus, the stator of the wind power generator is not stressed, and therefore, the stator will not be deformed when the rotor is driven to rotate. In particular, in a case that a vane has been mounted on the hub, a bending moment load in rotation of the rotor is large, and the stand 27 can provide a sufficient support force to drive the rotor to rotate.

Further, in this embodiment, the rotational load of the telescopic cylinder is transmitted to the stand 27 through the hinge base 521, the support plate 55 and the annular base 1. The stand 27 may be embodied as a housing structure, and an outer contour, towards the rotor, of the stand 27 is away from a rotation center of the rotor, that is, the outer contour, towards the rotor, of the housing structure has a large diameter, and the difference between the diameter of the outer contour and the diameter of the rotor is small. In this way, the lengths by which the hinge base 521 and the support plate 55 extend radially are short. Specifically, the lengths by which the hinge base 521 and the support plate 55 extend radially outwards from the annular base 1 are short.

A ratio of the diameter of the outer circumferential contour, towards the rotor 28, of the stand 27 to the diameter of the rotor 28 is in the range of 1/7 to 5/7. Preferably, the ratio of the diameter of the outer circumferential profile contour, towards the rotor 28, of the stand 27 to the diameter of the rotor 28 is about 3/7.

A ratio of a length by which the hinge base 521 and the support plate 55 extend in a radial direction of the rotor 28 to the diameter of the rotor 28 is in the range of 1/15 to 1/5. Preferably, the ratio is about 1/10.

Accordingly, when the telescopic cylinder 51 applies a driving force (a thrust force or a pulling force) to the rotor, the hinge base 521 and the support plate 55 are capable of withstanding a large shearing force in the circumferential direction of the rotor. Moreover, in the situation of bearing the circumferential shearing force of the same magnitude, this arrangement imposes a low requirement on the stiffness of the hinge base 521 itself and the stiffness of the support plate 55 itself.

Generally speaking, when the pressure of the hydraulic pump is constant, a thrust force generated when the telescopic cylinder extends is greater than a pulling force generated when the telescopic cylinder retracts. Thus, in arranging the rotating unit, it is preferable that the telescopic cylinder pushes the rotor 28 to rotate in the process of changing from the retracted state to the extended state. However, during the practical operation, it is inevitable that the rotating position of the rotor 28 will be deviated, and it requires to rotate the rotor 28 backwards by a certain angle to make correction. For rapidly achieving the correction of the position of the rotor 28 in the rotation process, the rotating units herein can be arranged as follows.

Figure 1:
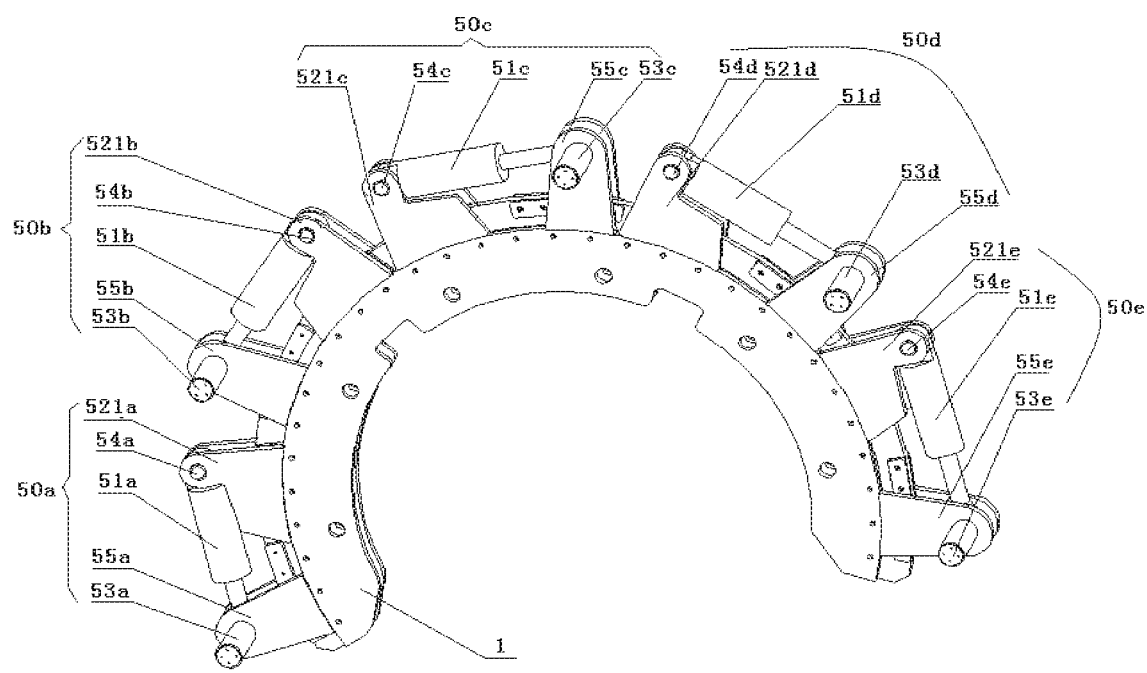
FIG. 1 is a schematic view showing the structure of a device for rotating a rotor of a wind power generator according to an embodiment of the present application.

In FIG. 1, all the rotating units are grouped into a first part and a second part according to the orientations of the telescopic cylinders 51 of the rotating units in the circumferential direction of the stand 27. The telescopic cylinders of the first part of the rotating units and the telescopic cylinders of the second pail of the rotating units are arranged back to back. In driving the rotor 28 to rotate, each of the telescopic cylinders in the first part extends gradually and each of the telescopic cylinders in the second part retracts gradually, thereby driving the rotor 28 to rotate in a first direction. Alternatively, each of the telescopic cylinders in the first part gradually retracts and each of the telescopic cylinders in the second part gradually extends, thereby driving the rotor 28 to rotate in a second direction. The second direction is opposite to the first direction.

That is, the telescopic cylinders of the first part of the rotating units and the telescopic cylinders of the second part of the rotating units have different movement trends in the process of driving the rotor 28 to rotate, and specifically, one part is in the gradually extending state and the other part is in the gradually retracting state.

In driving the rotor 28 to rotate in the first direction, the first part of the rotating units in the extending state can allow the rotor 28 to rotate fast, and when the rotor 28 needs to be rotated in the second direction for position correction, the second part of rotating units can be converted into the gradually extending state, to achieve a rapid correction of the position of the rotor 28 towards the opposite direction. In addition, when the rotor 28 is driven to rotate according to this embodiment, a part of the rotating units are controlled to be in the gradually extending state (to apply a thrust force to the rotor 28), and the other part of the rotating units are controlled to be in the gradually retracting state (to apply a pulling force to the rotor 28), which facilitates improving the safety and coping capacity in dealing with emergencies in vane installation.

It is to be noted that herein the gradually extending state of the rotating units and the gradually retracting state of the rotating units described above refer to the gradually extending state and the gradually retracting state of the telescopic cylinders in the rotating units, respectively.

Hereinafter, a rotating device having five rotating units is taken as an example to illustrate the process of driving the rotor to rotate by using the rotating device. As shown in FIG. 1, for facilitating the description, the rotating units are defined from left to right as a first rotating unit 50a, a second rotating unit 50b, a third rotating unit 50c, a fourth rotating unit 50d and a fifth rotating unit 50e. Structures of the five rotating units are shown in FIG. 5, and the bodies of the mounting bases of the five rotating units are connected to form the annular base 1.

The telescopic cylinder of the first rotating unit 50a is defined as a first telescopic cylinder 51a, and accordingly, the remaining telescopic cylinders are defined sequentially from left to right as a second telescopic cylinder 51b, a third telescopic cylinder 51c, a fourth telescopic cylinder 51d, and a fifth telescopic cylinder 51e. Similarly, the pins are defined sequentially from left to right as a first pin 53a, a second pin 53b, a third pin 53c, a fourth pin 53d, and a fifth pin 53e; and the pins are respectively connected to a first support plate 55a, a second support plate 55b, a third support plate 55c, a fourth support plate 55d, and a fifth support plate 55e.

Similarly, the mounting bases are defined sequentially from left to right as a first hinge base 521a, a second hinge base 521b, a third hinge base 521c, a fourth hinge base 521d and a fifth hinge base 521e. In addition, hinge shafts by which the hinge bases are hinged to the corresponding telescopic cylinders are shown in FIG. 1, and the hinge shafts are defined from left to right as a first hinge shaft 54a, a second hinge shaft 54b, a third hinge shaft 54c, a fourth hinge shaft 54d and a fifth hinge shaft 54e.

In the process of driving the rotor 28 to rotate, the first telescopic cylinder 51a and the second telescopic cylinder 51b have the same movement states, and the third telescopic cylinder 51c, the fourth telescopic cylinder 51d and the fifth telescopic cylinder 51e have the same movement states.

The process of driving the rotor 28 to rotate counterclockwise by the rotating units is described below with reference to the example in FIG. 1. Before operation, the first pin 53a, the second pin 53b, the third pin 53c, the fourth pin 53d and the fifth pin 53e are placed inside corresponding pin holes of the side wall of the rotor 28 respectively, and the annular base 1 is fixed to the stand 27. In an initial state, the first telescopic cylinder 51a and the second telescopic cylinder 51b are in a retracted state, and the third telescopic cylinder 51c, the fourth telescopic cylinder 51d and the fifth telescopic cylinder 51e are in an extended state.

In the process of driving the rotor 28 to rotate counterclockwise, the first telescopic cylinder 51a and the second telescopic cylinder 51b extend gradually to change from the retracted state to the extended state to apply a counterclockwise thrust force to the rotor by the pins 53a and 53b, and the third telescopic cylinder 51c, the fourth telescopic cylinder 51d and the fifth telescopic cylinder 51e retract gradually to change from the extended state to the retracted state to apply a counterclockwise pulling force to the rotor by the pins 53c, 53d and 53e, thereby together driving the rotor 28 to rotate counterclockwise. The rotor 28 is rotated by a rotational angle of approximately 7.5 degrees after each of the telescopic cylinders perform one stroke movement.

In a case that the present application is applied to install or detach the vane, it is required to perform sixteen stroke movements to rotate the hub by 120 degrees by means of the rotating device according to the present application without requiring the nacelle to be yawed. For example, a connection port for mounting a first vane is rotated to a 9 o'clock position, and after the first vane is mounted, the hub is rotated by 120 degrees, to allow a connection port for mounting a second vane to be rotated to the 9 o'clock position, and then the second vane is mounted. A third vane is also mounted similarly.

Thus, in the whole process of hoisting the vanes, the nacelle does not have to be yawed and each vane is mounted at the fixed 9 o'clock position. The hoisting position of the crane for hoisting the vanes is not required to be adjusted frequently to make the vanes be accurately aligned with the connecting ports in the hub. This can significantly improve the hoisting efficiency for the hoisting process of large wind power generators.

Before the rotor 28 is driven to rotate counterclockwise, the sequence for unlocking the pins of the rotating units are as follows.

A first step is unlocking the first pin 53a. In this step, the first group of rotating units include the first rotating unit 50a, and the second group of rotating units include the second, third, fourth and fifth rotating units 50b, 50c, 50d, 50e. The second, third, fourth and fifth pins 53b, 53c, 53d and 53e in the second group of rotating units are maintained in a locked state. The first pin 53a in the first group of rotating units is controlled to be disengaged from the pin hole first, the first telescopic cylinder 51a is converted from an extended state to a retracted state, to pull the first support plate 55a to slide rightwards along a circumferential direction of the annular base 1, to allow the first pin 53a to be aligned with a corresponding pin hole in the rotor 28, and then the first pin 53b is driven to extend into the pin hole and is locked.

A second step is unlocking the second pin 53b. In this step, the first group of rotating units include the second rotating unit 50b, and the second group of rotating units include the first, third, fourth and fifth rotating units 50a, 50c, 50d, 50e. The first, third, fourth and fifth pins 53a, 53c, 53d, 53e in the second group of rotating units are maintained in the locked state. The second pin 53b in the first group of rotating units is controlled to be disengaged from the pin hole, and then the telescopic cylinder retracts to the retracted state, and the second pin 53b extends into the pin hole, directly aligned with the second pin 53b, of the rotor 28 and is locked.

A third step is unlocking the third pin 53c. In this step, the first group of rotating units include the third rotating unit 50c, and the second group of rotating units include the first rotating unit 50a, the second rotating unit 50b, the fourth rotating unit 50d and the fifth rotating unit 50e. The first pin 53a, the second pin 53b, the fourth pin 53d and the fifth pin 53e in the second group of rotating units are maintained in the locked state. The third pin 53c in the first group of rotating units is controlled to be disengaged from the pin hole, and then the telescopic cylinder extends to an extended state, and the third pin 53c then extends into a pin hole, directly aligned with the third pin 53c, of the rotor 28 and is locked.

A fourth step is maintaining the first pin 53a, the second pin 53b, the third pin 53c and the fifth pin 53e in the locked state; and the operations of the fourth pin 53d and the fourth telescopic cylinder 51d are similar to the operations of the third pin 53c and the third telescopic cylinder 51c in the last step, to realize the relocking of the fourth pin 53d.

A fifth step is maintaining the first pin 53a, the second pin 53b, the third pin 53c and the fourth pin 53d in the locked state; and the operations of the fifth pin 53e and the fifth telescopic cylinder 51e are similar to the operations of the third pin 53c and the third telescopic cylinder 51c in the third step, to realize the relocking of the fifth pin 53e.

In the above embodiments, the pins are unlocked and relocked individually, and when one pin is operated, other pins are in the locked state. This may keep the rotor 28 in a fixed position. In particular, during the installation of a single vane, for example, when one vane has been mounted on the hub, the rotor 28 needs a sufficient torque to support this vane. The fixing effects of other four pins in combination with the total torques generated by other four telescopic cylinders are sufficient to fix the rotor 28.

Of course, the pins are not limited to be disengaged one by one, instead, two or more pins can be controlled to be unlocked or relocked simultaneously, as long as the rest pins can reliably fix the rotor 28.

After the pins 53a, 53b, 53c, 53d, 53e of all the rotating units are fixed again, the telescopic cylinders 51a, 51b, 51c, 51d, 51e of all the rotating units are driven to perform the stroke movements simultaneously to drive the rotor 28 to rotate. According to the example in FIG. 1, after the fifth step is performed, the telescopic cylinders 51a and 51b are driven simultaneously to change from the retracted state to the extended state, and the telescopic cylinders 51c, 51d and 51e are driven to change from the extended state to the retracted state, thereby driving the rotor 28 to rotate counterclockwise by about 7.5 degrees.

Figure 4:
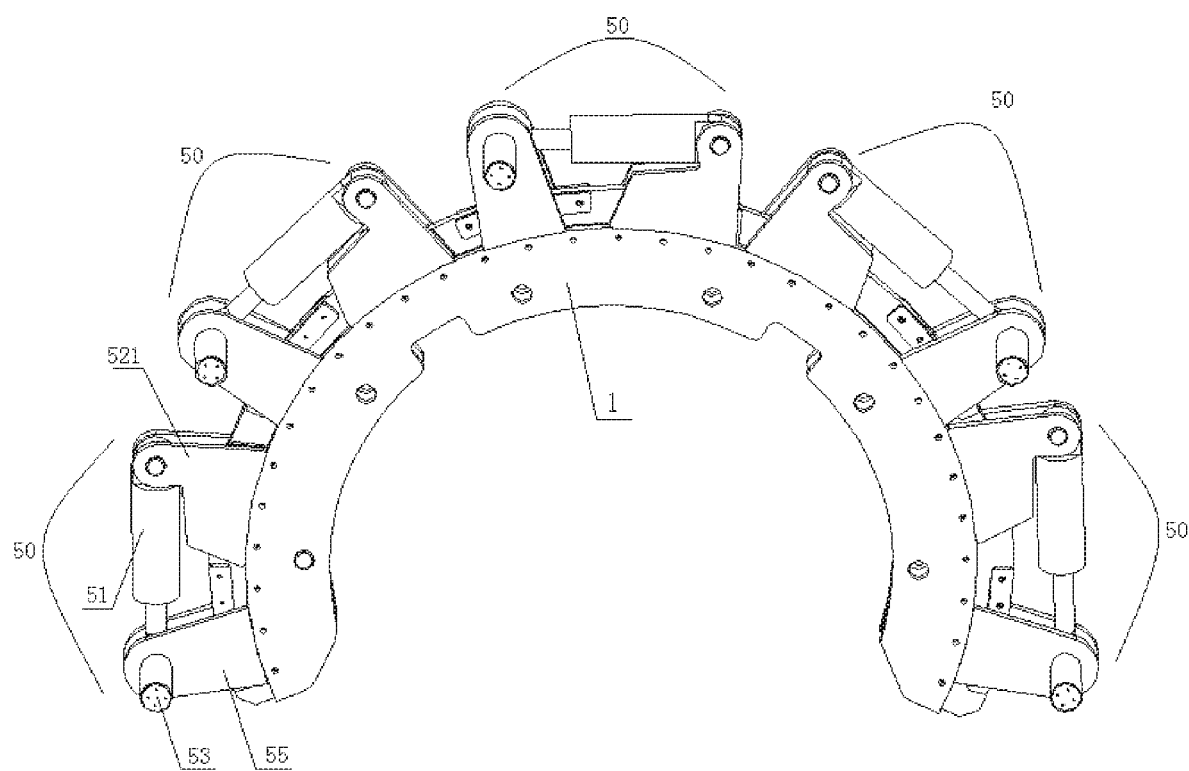
FIG. 4 is a schematic view showing the structure of a device for rotating the rotor of the wind power generator according to a third embodiment of the present application.

Of course, the arrangement of the rotating units is not limited to the above description, and two other arrangements of the rotating units are shown in FIGS. 3 and 4.

In FIG. 3, the rotating units are arranged sequentially in the same orientation along the circumferential direction of the stand 27, that is, extending directions of cylinder rods of the telescopic cylinders in all the rotating units are all clockwise, that is, in the process of driving the rotor 28 to rotate, all the telescopic cylinders extend gradually at the same time or retract gradually at the same time, that is, the movement trends of all the telescopic cylinders are the same. The arrangement is not limited to the form shown in FIG. 3, and similarly, the telescopic cylinders in the rotating units may be arranged so that the extending directions of the cylinder rods are all counterclockwise.

FIG. 1 and FIG. 4 both show the embodiments in which the telescopic cylinders are arranged back to back, that is, according to the orientation of the telescopic cylinder 51 in the rotating unit and the relative position between the hinge base 521 and the support plate 55, all the rotating units are grouped into a first part and a second part, the telescopic cylinders of the first part of the rotating units and the telescopic cylinders of the second part of the rotating units are arranged back to back. Specifically, the term "back to back" arrangement refers to that the telescopic cylinders of the first part of the rotating units and the telescopic cylinders of the second part of the rotating units are arranged to have opposite orientations in the circumferential direction of the stand 27; that is, the cylinder rods of the telescopic cylinders of the first part of the rotating unit and the cylinder rods of the telescopic cylinders of the second part of the rotating unit extend oppositely in the circumferential direction of the stand 27.

FIG. 1 shows an embodiment in which the two rotating units at the left and the three rotating units at the right in the five rotating units are arranged back to back. Specifically, in FIG. 1, the first part of the rotating units include the rotating units 50a and 50b, and the second part of the rotating units include the rotating units 50c, 50d and 50e. The telescopic cylinders 51a and 51b of the first part of the rotating units extend counterclockwise in the circumferential direction of the stand 27, and the telescopic cylinders 51c, 51d and 51e of the second part of the rotating units extend clockwise in the circumferential direction of the stand 27.

When the five rotating units drive the rotor 28 to rotate clockwise, the telescopic cylinders of the second part of rotating units 50c, 50d and 51e extend gradually rightwards, and the two telescopic cylinders of the first part of rotating units 50a and 50b retract gradually leftwards, thereby together driving the rotor to rotate. Similarly, when the five rotating units drive the rotor 28 to rotate counterclockwise, the above telescopic cylinders operate in the opposite directions, which will not be described in detail here.

In FIG. 4, the first part includes three rotating units at the left and the second part includes two rotating units at the right. In FIG. 4, the telescopic cylinders of the three rotating units at the left are mounted to have the same orientations, and the telescopic cylinders of the two rotating units at the right are mounted to have the same orientations. When the rotating units drive the rotor 28 to rotate counterclockwise, the telescopic cylinders of the three rotating units at the left extend gradually, and the telescopic cylinders of the two rotating units at the right retract gradually.

In order to ensure that the rotor 28 is deformed minimally during rotation, it is required to provide a uniform action force to the rotor in the circumferential direction of the rotor. Considering that the thrust force and the pulling force generated by the telescopic cylinder are different, in a preferred embodiment, the telescopic cylinders of the first part of the rotating units and the telescopic cylinders of the second part of the rotating units are alternately arranged, that is, the telescopic cylinders applying pulling forces and the telescopic cylinders applying thrust forces are alternately arranged. In this way, the hydraulic cylinders of the rotating units can provide uniform action forces in the circumferential direction of the rotor 28.

As can be seen from the above analysis, according to the back to back arrangements shown in FIGS. 1 and 4, the driving force for driving the rotor to rotate counterclockwise and the driving force for driving the rotor to rotate clockwise are substantially the same, particularly after the vane is mounted on the hub, it requires large driving forces, and this back-to-back arrangement can provide substantially balanced bi-directional driving forces.

Figure 6:
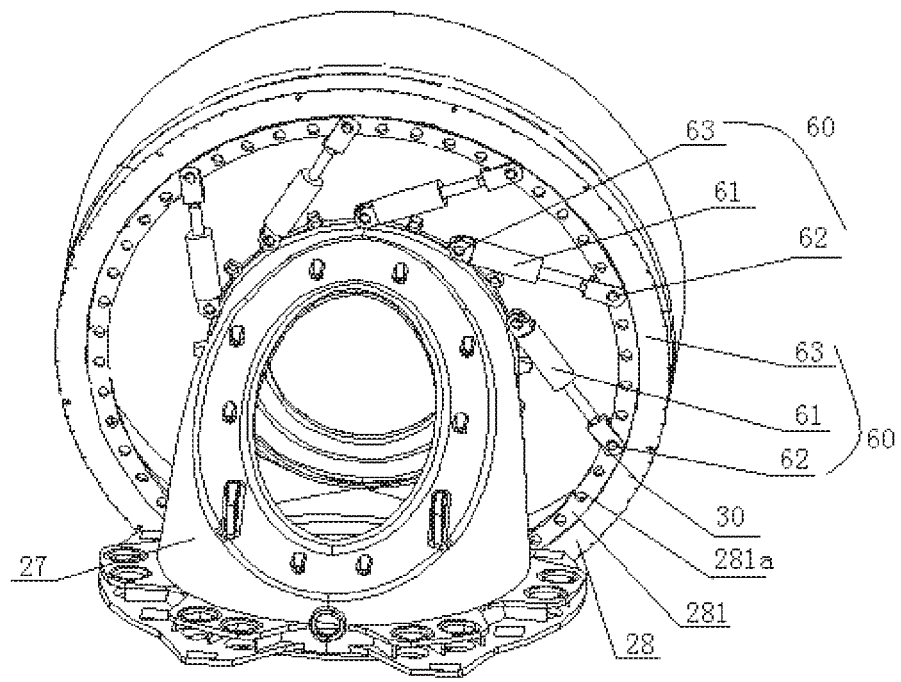
FIG. 6 is a schematic view showing a local structure of a device for rotating the rotor of the wind power generator according to a fifth embodiment of the present application, which is mounted on the wind power generator.

Another device for rotating the rotor of the wind power generator is further provided according to the present application, and the structure thereof is shown in FIG. 6. The device includes at least two rotating units 60. The rotating unit 60 includes a telescopic cylinder 61 and a pin 62. A fixed end of the telescopic cylinder 60 is detachably connected to the stand 27. Preferably, the fixed end of the telescopic cylinder 60 is connected to the stand 27 through a hinge shaft 63. The connection is not limited to this, and may also be achieved by a bolt, a fixture, or otherwise.

The pin 62 is provided at a movable end of the telescopic cylinder 61, the pin 62 is releasably fixed to the rotor 28, and the rotor 28 is driven to rotate relative to the stand 27 by the stroke movement of the telescopic cylinder 61.

FIG. 6 illustrates five rotating units 60. Similar to the above embodiments, in the embodiment in FIG. 6, all the rotating units are divided into two groups according to the movement states of the rotating units in the unlocking process. A first group is defined as an unlocking unit group, and a second group is defined as a locking unit group. In the process that the movable ends of the telescopic cylinders 61 of the first group of rotating units 60 are detached from the rotor 28 and then are fixed to the rotor 28 again, the pins 62 of the second group of rotating units are fixedly connected to the rotor 28. In this way, the locking of position of the rotor 28 can be achieved without requiring an additional locking means, thus improving the safety in vane installation and vane maintenance, and facilitating the simplification of the mechanism.

In FIG. 6, all the telescopic cylinders 61 are arranged in the same orientations in the circumferential direction of the stand 27, that is, extending directions of cylinder rods of the telescopic cylinders in all the rotating units are clockwise. When the rotor 28 is driven to rotate counterclockwise, the cylinder rods of all the telescopic cylinders are gradually shortened, that is, the movement trends of all the telescopic cylinders are the same. The arrangement is not limited to the form shown in FIG. 6, and similarly, the telescopic cylinders in all the rotating units may be arranged so that the extending directions of all the cylinder rods are counterclockwise.

Figure 7:
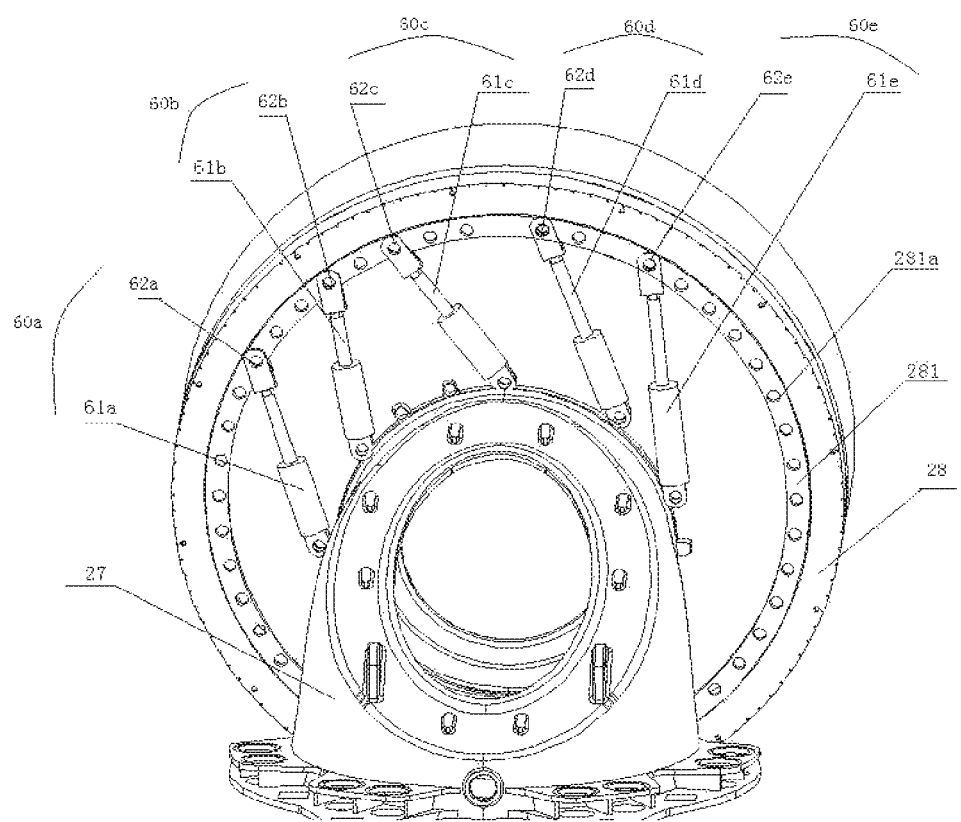
FIG. 7 is a schematic view showing a local structure of a device for rotating the rotor of the wind power generator according to a sixth embodiment of the present application, which is mounted on the wind power generator.

As shown in FIG. 7, for the convenience of description, the rotating units are defined from left to right as a first rotating unit 60*a*, a second rotating unit 60*b*, a third rotating unit 60*c*, a fourth rotating unit 60*d* and a fifth rotating unit 60*e*. The telescopic cylinders 61*a*, 61*b*, 61*c*, 61*d* and 61*e* of the five rotating units in FIG. 7 are arranged back to back. Specifically, the five rotating units are grouped into a first part and a second part according to the orientations of the telescopic cylinders in the rotating units. The first part includes two rotating units at the left and the second part includes three rotating units at the right. The telescopic cylinders 61*a* and 61*b* of the first part extend clockwise in the circumferential direction of the stand 27, and the telescopic cylinders 61*c*, 61*d* and 61*e* of the second part extend counterclockwise in the circumferential direction of the stand 27.

For example, when the rotor is rotated counterclockwise, the telescopic cylinders 61*a* and 61*b* of the first part retract gradually and the telescopic cylinders 61*c*, 61*d* and 61*e* of the second part extend gradually; and when the rotor is driven to rotate clockwise, the telescopic cylinders 61*a* and 61*b* of the first part gradually extend, and the telescopic cylinders 61*c*, 61*d* and 61*e* of the second part gradually retract. Therefore, the driving force for driving the rotor to rotate counterclockwise and the driving force for driving the rotor to rotate clockwise are substantially the same.

In each of the above embodiments, since the outer contour, towards the rotor, of the stand 27 is away from the rotating center of the rotor, that is, the outer contour, towards the rotor, of the housing structure has a large diameter, the difference between the diameter of the outer contour and the diameter of the rotor is small, and the ratio of the length of the telescopic cylinder 61 in the retracted state to the diameter of the rotor 28 is in the range of 1/16 to 1/4.

Preferably, the length of the telescopic cylinder 61 in the retracted state is about 3/16 of the diameter of the rotor 28.

Therefore, when the telescopic cylinder 61 applies a driving force (a thrust force or a pulling force) to the rotor, the telescopic cylinder 61 can withstand a large shearing force in the circumferential direction of the rotor.

Preferably, the telescopic cylinders of the first part of the rotating units and the telescopic cylinders of the second part of the rotating units are arranged alternately, that is, the telescopic cylinders applying pulling forces and the telescopic cylinders applying thrust forces are arranged alternately. In this way, the hydraulic cylinders of all the rotating units can provide uniform action forces to the rotor 28 in the circumferential direction of the rotor 28.

The initial state described herein refers to a state before the telescopic cylinders drive the rotor to move, and in this state, the telescopic cylinders and the mounting bases are fixed to the stand, and the pins are locked with the rotor.

Further, the rotating unit may include a U-shaped plate 30 having two side walls and a transverse wall 303 connecting the two side walls. The pin is arranged on one side wall of the U-shaped plate 30. When the pin is fitted into the rotor 28, the two side walls of the U-shaped plate 30 are located at two sides of an additional frame 281 of the rotor 28, and a telescopic end of the pin passes through the two side walls of the U-shaped plate 30 and the additional frame 281.

Figure 8:
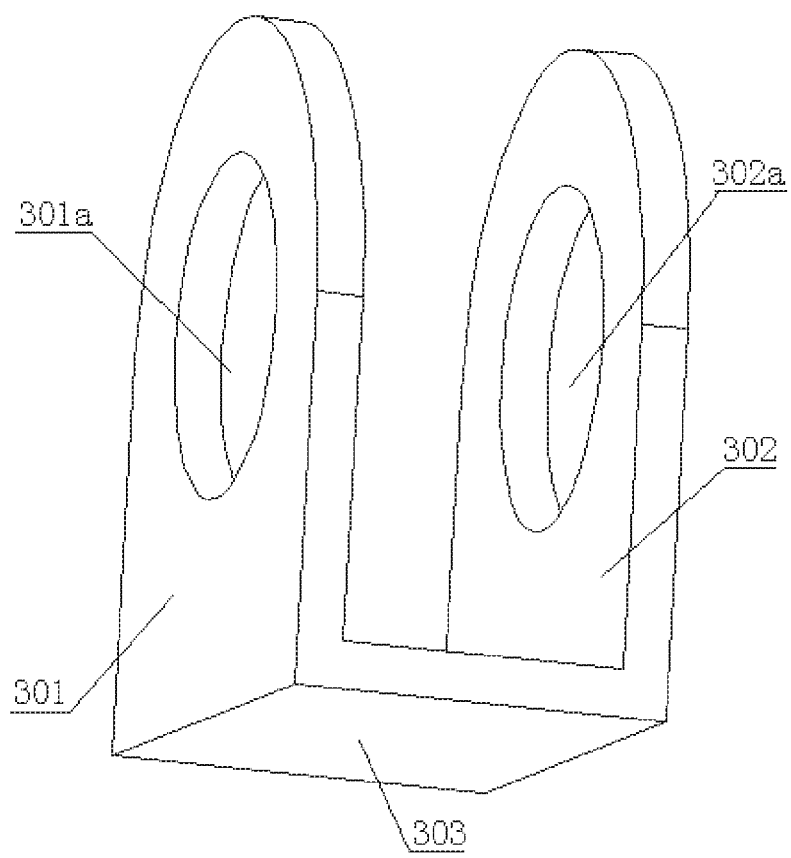
FIG. 8 is a schematic view showing a three-dimensional structure of a U-shaped plate.

As shown in FIG. 8, the two side walls of the U-shaped plate 30 are defined as a first side wall 301 and a second side wall 302 respectively. The first side wall 301 and the second side wall 302 are provided with a through hole 301*a* and a through hole 302*a* respectively, and the through hole 301*a* and the through hole 302*a* are coaxially arranged. In mounting the U-shaped plate 30, the pin 62 is arranged to pass through the through hole 301*a*, the through hole 302*a* and a pin hole 281*a* of the additional frame 281, to locking the relative position between the telescopic cylinder and the rotor 28.

The U-shaped plate 30 is connected to the additional frame 281 of the rotor 28. With this connection, a lateral force applied to the generator rotor 28 by the telescopic cylinder when the telescopic cylinder drives the rotor 28 is small, and the deformation of the generator can be reduced.

The control of the unlocking and relocking of the rotating units in FIG. 6 and FIG. 7 is similar to the control process of the rotating units in FIG. 1.

Taking FIG. 7 as an example, the unlocking order of the pins of the rotating units before driving the rotor 28 to rotate clockwise is described as follows.

A first step is unlocking the pin 62*a* at the movable end of the telescopic cylinder 61*a*. In this step, the first group of rotating units include the rotating unit 60*a*, and the second group of rotating units include the second, third, fourth and fifth rotating units 60*b*, 60*c*, 60*d*, 60*e*. The second, third, fourth and fifth pins 62*b*, 62*c*, 62*d*, 62*e* in the second group of rotating units are maintained in a locked state, the first pin 62*a* in the first group of rotating units is controlled to be disengaged from the pin hole first, then the first telescopic cylinder 61*a* is changed from an extended state to a retracted state, and then the pin 62*a* is pulled to slide leftwards in the circumferential direction of the rotor 28, to allow the pin 62*a* to be directly aligned with a corresponding pin hole in the rotor 28, and then the pin 62*a* is driven to extend into the pin hole and is locked.

A second step is unlocking the pin 62*b* at the movable end of the telescopic cylinder 61*b*. In this step, the first group of rotating units include the second rotating unit 60*b*, and the second group of rotating units include the first, third, fourth and fifth rotating units 60a, 60c, 60d, 60e. The pins 62a, 62c, 62d, 62e in the second group of rotating units are maintained in the locked state, and the pin 62b in the first group of rotating units is controlled to be disengaged from the pin hole, and then the telescopic cylinder 61h is retracted to be in a retracted state, the pin 62b is pulled to slide leftwards in the circumferential direction of the rotor 28, to allow the pin 62h to extend into a pin hole, directly aligned with the pin 62b, of the rotor 28 and is locked.

A third step is unlocking the pin 62c at the movable end of the telescopic cylinder 62b. In this step, the first group of rotating units include the third rotating unit 60c, and the second group of rotating units include the first, second, fourth and fifth rotating units 60a, 60b, 60d, 60e. The pins 62a, 62h, 62d and 62e in the second group of rotating units are maintained in the locked state, and the pin 62 in the first group of rotating units is controlled to be disengaged from the pin hole, and then the telescopic cylinder 61c extends to be in an extended state, to push the pin 62c to slide leftwards in the circumferential direction of the rotor 28, and the pin 62c then extends into a pin hole, directly aligned with the pin 62c, of the rotor 28 and is locked.

In a fourth step, the pins 62a, 62b, 62c, 62e are maintained in the locked state, and the operations of the pin 62d and the telescopic cylinder 61d are similar to the operations of the pin 62c and the telescopic cylinder 61c in the last step, to relock the pin 62d.

In a fifth step, the pins 62a, 62b, 62c, 62d are maintained in the locked state, and the operations of the pin 62e and the telescopic cylinder 61e are similar to the operations of the pin 62c and the telescopic cylinder 61c in the third step, to relock the pin 62e.

In the above embodiments, the pins are unlocked and relocked individually, and when one pin is operated, other pins are in the locked state.

After the pins 62a, 62b, 62c, 62d, 62e of all the rotating units are fixed again, the telescopic cylinders 61a, 61b, 61c, 61d, 61e of all the rotating units are driven to perform the stroke movements simultaneously, to drive the rotor 28 to rotate. In the example of FIG. 7, after the above fifth step is performed, the telescopic cylinders 61a and 61b are driven simultaneously to be changed from the retracted state to an extended state, and the telescopic cylinders 61c, 61d and 61e are driven to be changed from the extended state to a retracted state, thereby driving the rotor 28 to rotate clockwise.

When the device shown in FIGS. 6 and 7 is applied to vane installation or vane maintenance, the telescopic cylinders 61, the pins 62 and the U-shaped plates 30 are first lifted into the nacelle. Then, the fixed ends of the telescopic cylinders 61 are connected to the stand 27, and the movable ends of the telescopic cylinders are fixed to the rotor 28 by pins 62. Finally, the telescopic cylinders 61 are controlled to perform the stroke movements, to drive the rotor 28 to rotate relative to the stand 27.

After the vane installation or vane maintenance is finished, the fixed ends of the telescopic cylinders 61 are detached from the stand 27, and the pins 62, the U-shaped plates 30 and the movable ends of the telescopic cylinders 61 are detached from the rotor 28, and then the pins 62, the U-shaped plates 30 and the telescopic cylinders 61 are lifted out of the nacelle.

The devices according to the embodiments in FIGS. 6 and 7 are easier to move and lift during installation and detachment.

The power driving the pins to extend or retract in the above embodiments may be derived from a driving component, that is, the rotating unit may further include a driving component configured to drive the pin to extend or retract, to allow the pin to extend into or be disengaged from the pin hole. When the pin is embodied as a hydraulic pin, the driving component is embodied as hydraulic oil; and when the pin is embodied as a pneumatic pin, the driving component is embodied as compressed air.

Although, the specific structure of the driving component is not shown herein, this does not obstruct the person skilled in the art from understanding and implementing the technical solution herein.

On the basis of the device for rotating the rotor of the wind power generator described above, a wind power generator is further provided according to the present application. A side wall of a rotor 28 is provided with several pin holes 28a arranged in a circumferential direction of the rotor 28 and extending radially. The pin holes 28a cooperate with the corresponding pins 53 of the device for rotating the rotor of the wind power generator according to the above embodiments, to realize locking.

A wind power generator is further provided according to the present application. A rotor 28 is provided with an additional frame 281, and the additional frame 281 is provided with several pin holes 281a arranged in a circumferential direction of the additional frame 281. The pin holes 281a cooperate with the corresponding pins 62 of the device for rotating the rotor of the wind power generator according to the above embodiments, to realize locking.

In addition, the housing of the nacelle is provided with a mounting opening, so that the device for rotating the rotor of the wind power generator can be mounted into or detached from the nacelle via the mounting opening. A detachable sealing plate is further provided at the position of the mounting opening.

The device and method for rotating the rotor of the wind power generator and the wind power generator according to the present application are described in detail hereinbefore. The principle and the embodiments of the present application are illustrated herein by specific examples. The above description of examples is only intended to help the understanding of the method and concept of the present application. It should be noted that, for the person skilled in the art, a few of modifications and improvements may be made to the present application without departing from the principle of the present application, and these modifications and improvements are also deemed to fall into the scope of protection of the present application defined by the claims.

What is claimed is:

1. A device for rotating a rotor of a wind power generator, comprising at least two rotating units, each of the rotating units comprising:
   a telescopic cylinder;
   a mounting base configured to connect a fixed end of the telescopic cylinder to a stand of the wind power generator, and detachably connected to the stand; and
   a pin arranged at a movable end of the telescopic cylinder, configured to be releasably fixed to the rotor, and configured to drive the rotor to rotate relative to the stand by a stroke movement of the telescopic cylinder,
   wherein all of the rotating units are divided into a first group and a second group, and in a process that the pin of the first group of rotating units is detached from the rotor and again fixed to the rotor, the pin of the second group of rotating units is fixedly connected to the rotor.

2. The device for rotating the rotor of the wind power generator according to claim 1, wherein the mounting base comprises a hinge base and a body, the hinge base is arranged on the body, and the fixed end of the telescopic cylinder is hinged to the hinge base, and
the mounting base is further provided with a support plate, the movable end of the telescopic cylinder is detachably connected to the support plate, the support plate is configured to move back and forth relative to the body, and the pin is arranged at the support plate.

3. The device for rotating the rotor of the wind power generator according to claim 2, wherein the bodies of the mounting bases of the at least two rotating units are connected to form an annular base, and the annular base has an opening facing the stand;
the hinge bases of the mounting bases of the rotating units are fixedly connected to the annular base;
the annular base is provided with a guide portion, and the support plates of the rotating units are slidably connected to the guide portion; and
the annular base is detachably connected to the stand.

4. The device for rotating the rotor of the wind power generator according to claim 3, wherein the annular base has a radian ranging from 170 to 220 degrees; or
the annular base has a radian ranging from 90 degrees to 360 degrees.

5. The device for rotating the rotor of the wind power generator according to claim 2, wherein a ratio of a length by which each of the hinge bases and the support plates extends in a radial direction of the rotor to a diameter of the rotor ranges from 1/15 to 1/5; or,
a ratio of a length by which each of the hinge bases and the support plates extends in a radial direction of the rotor to a diameter of the rotor is about 1/10.

6. The device for rotating the rotor of the wind power generator according to claim 1, wherein the telescopic cylinders of all the rotating units are arranged in same orientations in a circumferential direction of the stand.

7. A device for rotating a rotor of a wind power generator, comprising at least two rotating units, each of the rotating units comprising:
a telescopic cylinder;
a mounting base configured to connect a fixed end of the telescopic cylinder to a stand of the wind power generator, and detachably connected to the stand; and
a pin arranged at a movable end of the telescopic cylinder, configured to be releasably fixed to the rotor, and configured to drive the rotor to rotate relative to the stand by a stroke movement of the telescopic cylinder,
wherein all the rotating units are grouped into a first part and a second part, and the telescopic cylinder of the first part of the rotating units and the telescopic cylinder of the second part of the rotating units are arranged to have opposite orientations in a circumferential direction of the stand.

8. The device for rotating the rotor of the wind power generator according to claim 7, wherein the telescopic cylinder of the first part of rotating units and the telescopic cylinder of the second part of rotating units are arranged alternately.

9. A device for rotating a rotor of a wind power generator, comprising at least two rotating units, and each of the rotating units comprising a telescopic cylinder and a pin, wherein,
a fixed end of the telescopic cylinder is detachably connected to the stand; and
the pin is arranged at a movable end of the telescopic cylinder, is configured to be releasably fixed to a rotor, and is configured to drive the rotor to rotate relative to the stand by a stroke movement of the telescopic cylinder,
wherein all of the rotating units are divided into a first group and a second group, and in a process that the movable end of the telescopic cylinder of the first group of rotating units is detached from the rotor and then again fixed to the rotor, the pin of the second group of rotating units is fixedly connected to the rotor.

10. The device for rotating the rotor of the wind power generator according to claim 9, wherein a ratio of a length of the telescopic cylinder in a retracted state to a diameter of the rotor ranges from 1/16 to 1/4; or,
a ratio of a length of the telescopic cylinder in a retracted state to a diameter of the rotor is about 3/16.

11. The device for rotating the rotor of the wind power generator according to claim 9, wherein the telescopic cylinders of all the rotating units are arranged in same orientations in a circumferential direction of the stand.

12. A device for rotating a rotor of a wind power generator, comprising at least two rotating units, and each of the rotating units comprising a telescopic cylinder and a pin, wherein,
a fixed end of the telescopic cylinder is detachably connected to the stand; and
the pin is arranged at a movable end of the telescopic cylinder, is configured to be releasably fixed to a rotor, and is configured to drive the rotor to rotate relative to the stand by a stroke movement of the telescopic cylinder,
wherein each of the rotating units further comprises a U-shaped plate, and the U-shaped plate comprises two side walls and a transverse wall connecting the two side walls, and the two side walls of the U-shaped plate are located at two sides of an additional frame of the rotor respectively;
the pin passes through the two side walls of the U-shaped plate and the additional frame; and
the transverse wall of the U-shaped plate is connected to the movable end of the telescopic cylinder.

13. A device for rotating a rotor of a wind power generator, comprising at least two rotating units, and each of the rotating units comprising a telescopic cylinder and a pin, wherein,
a fixed end of the telescopic cylinder is detachably connected to the stand; and
the pin is arranged at a movable end of the telescopic cylinder, is configured to be releasably fixed to a rotor, and is configured to drive the rotor to rotate relative to the stand by a stroke movement of the telescopic cylinder,
wherein all the rotating units are grouped into a first part and a second part, and the telescopic cylinder of the first part of rotating units and the telescopic cylinder of the second part of rotating units are arranged to have opposite orientations in a circumferential direction of the stand.

14. The device for rotating the rotor of the wind power generator according to claim 13, wherein the telescopic cylinder of the first part of rotating units and the telescopic cylinder of the second part of rotating units are arranged alternately.

* * * * *